Patented June 10, 1952

2,599,813

UNITED STATES PATENT OFFICE 2,599,813

STABILIZATION OF RESINS

Willie W. Crouch and John F. Howe, Bartlesville, Okla., assignors to Phillips Petroleum Company, a corporation of Delaware No Drawing. Application January 2, 1951, Serial No. 204,065

22 Claims. (Cl. 260—29.6)

This invention relates to new heteropolymeric resin compositions and their preparation. In another aspect this invention relates to a method for stabilizing polysulfone resins formed by the interreaction of sulfur dioxide with an unsaturated organic material, to decomposition by heat.

It has been known for a number of years that sulfur dioxide will react with numerous unsaturated organic materials to form heteropolymeric resinous products. Various prior art methods for the formation of these resinous materials, include bulk polymerization, solution polymerization and emulsion polymerization.

Apparently the resin is produced from equimolar quantities of sulfur dioxide and the unsaturated organic material. The reaction appears to take place only in the liquid phase and it will proceed in the absence of catalysts only in the presence of actinic light, or it will proceed in the presence of any one of a large number of catalytic materials, most of which appear to have oxidizing properties, in the dark or in the light. Some of the more important catalysts for promoting this reaction are oxygen, hydrogen peroxide, ozone, various nitrates such as silver and lithium nitrates, nitrites, persulfates, chlorates, perchlorates, ascaridole, ozonized olefins, etc. Organic compounds which enter into the formation of such resins include mono-olefins, cycloolefins, substituted aliphatic olefins such as styrene, diolefins such as butadiene, isoprene, cyclohexadiene, and the like, acetylenes and polyfunctional unsaturated compounds such as allyl alcohol, vinyl acetate, allyl ethyl ether, o-allylanisole, o-allylphenol, p-bromoallylbenzene, methyl undecylenate, undecylenyl alcohol, undecylenic acid, etc. When mixtures of such unsaturated organic compounds are used, the resulting resin appears to have been formed by a copolymerization of the unsaturated compounds with sulfur dioxide since its properties do not correspond to blends of resins produced from the individual unsaturated organic compounds and often have properties which are superior to any one of the resins produced from the individual unsaturated compounds. For many of the unsaturated compounds there appears to be a "ceiling temperature" above which the reaction does not take place, and in such instances it is necessary to conduct the resin-forming reaction at a temperature below the ceiling temperature and, when forming the resin from a mixture of organic unsaturated compounds, it appears desirable to conduct the reaction at a temperature below the ceiling temperature of the material having the lowest ceiling temperature. The resin-forming reaction is somewhat exothermic and generally some provision must be made for removing the heat of reaction. All of these features are more fully described in the literature.

These heteropolymers of sulfur dioxide and unsaturated organic materials are inherently inexpensive and have utility in numerous applications. However, utility of these resins has in the past been limited due in a large part to their lack of thermal stability, i. e., resistance to decomposition by heat, at temperatures such as from 200 to 500° F. Accordingly, these resins often cannot be employed satisfactorily in the production of molded articles. On being exposed to temperatures as high as 200° F. or higher over a short period, for example 1 to 3 hours, decomposition of the heteropolymer takes place to liberate sulfur dioxide and initial unsaturate reactant. The resin thus becomes porous and somewhat voluminous and is undesirable for the use for which it was intended. The addition of stabilizing agents to these heteropolymers has been suggested by workers in the art. These addition compounds include among others various organic solvent liquids, acrylic acid esters, vinyl acetate and acylating agents which act to remove occluded sulfur dioxide. However, these agents contribute a measure of stability to these heteropolymer resins only at temperatures at which such resins are not plastic and at which they cannot be molded. When heated to the elevated temperature necessary for molding operations such as 200 to 500° F. these stabilizing agents become ineffective.

We have discovered that heteropolymers of sulfur dioxide and certain unsaturated organic materials can be rendered highly resistant to decomposition by heat, when incorporated with certain tin-containing materials as stabilizing agents. When added to the heteropolymeric resin such a tin-containing material imparts excellent thermal stability to the resin, many of which additive materials completely inhibit its thermal decomposition at molding temperatures.

Our invention is concerned with new polysulfone resin compositions, and with a method for increasing the thermal stability of polysulfone resins formed by sulfur dioxide and certain unsaturated organic compounds, i. e., effecting an increase in resistance of such resins to heat.

An object of our invention is to provide resin compositions comprising heteropolymers of sulfur dioxide and an unsaturated organic compound, exhibiting improved resistance to heat.

Another object is to provide a method for increasing the thermal stability of heteropolymeric resins of sulfur dioxide and unsaturated organic compounds. Another object is to provide olefin-sulfur dioxide resin compositions thermally stable at molding temperatures. Another object is to provide for the utilization of selected tin-containing materials as agents for stabilizing olefin-sulfur dioxide resins. Another object is to provide for an increase in the thermal stability of butene-sulfur dioxide resins. Other objects will be apparent to those skilled in the art from the accompanying discussion and disclosure.

In accordance with a broad embodiment of our invention we incorporate a tin-containing material of the group consisting of metallic tin, a tin hydroxide, a tin oxide, and a tin salt excepting tin sulfide, with a heteropolymeric resin of sulfur dioxide and an unsaturated organic material which reacts with sulfur dioxide to form such a resin, the said unsaturated organic reactant material being preferably selected from at least one of the group consisting of mono-olefinic organic compounds containing not more than 20 carbon atoms in the molecule, and conjugated dienes, preferably diolefin hydrocarbons containing from 4 to 6 carbon atoms in the molecule, to increase the thermal stability of such a resin. Our invention provides for resin compositions derived from sulfur dioxide and unsaturated organic materials, that are thermally stable at thermoplastic conditions and that can be widely utilized in the manufacture of molded articles.

Among the various tin-containing materials that are employed as stabilizers in accordance with our invention are included metallic tin, stannous or stannic salts such as the halides, phosphates, sulfates, oxalates, tartrates, salts of carboxylic acids containing up to 24 carbon atoms in the molecule, stannous or stannic hydroxides, and stannous or stannic oxides. These stabilizer materials can be incorporated with the resin in any desired manner, the desired degree of stabilization generally being attained when the resin contains from about 0.1 to 15 per cent of its weight of the stabilizer. More generally, a content of from 0.2 to 10 weight per cent of the tin stabilizer in the resin is adequate, and in many instances from 0.5 to 5 weight per cent is sufficient.

The tin stabilizer materials can be incorporated in the resin material in a number of ways, the important factor being that the additive, i. e., the stabilizer, be thoroughly and intimately admixed with the resin. The stabilizer can be added to the finely powdered or precipitated dry resin by evenly distributing it thereon by means of a suitable mixing device, e. g. a stirrer means, ball mill, roll mill, or the like. The stabilizer can also be added as an aqueous solution or dispersion to the finely divided dry resin and thoroughly mixed therewith followed by evaporation of water. We usually prefer, however, to add an aqueous solution or dispersion of the stabilizer to a dispersion or suspension of the resin comprising the reaction mixture in which the resin was formed, particularly a latex formed as a result of the reaction of sulfur dioxide with an unsaturate, in aqueous emulsion. However, in any instances where only a portion of the additive tends to be carried down with the resin upon coagulation of the latex, it will be advantageous to incorporate the additive material directly with the filter cake, or with the powdered dry resin.

The latex containing the stabilizer is in the form of an emulsion and is extremely valuable in use of various impregnating and coating operations such as treatment of paper, cloth, and the like, at temperatures higher than have been heretofore possible, since the resin contained in the latex is in a more stable form as regards its resistance to decomposition by heat.

The reaction of sulfur dioxide with an olefin reactant in aqueous emulsion is effected in the presence of suitable catalysts and emulsifying agents. The resinous product obtained in the form of an emulsion, or latex, can be stripped with air to remove unreacted sulfur dioxide and olefinic reactants, and other volatile impurities. It can be readily washed and the removal of additional impurities is accomplished in this manner. The dry resin is recovered from the latex by coagulation followed by washing and drying the coagulum, and is generally in a finely divided form.

One procedure in carrying out such a resin-forming reaction in aqueous emulsion comprises the preparation of an aqueous emulsion of the olefinic reactant with sulfur dioxide, in the presence of a suitable emulsifying agent such as a salt of sulfonic acid or a surface active salt of an amine, and a catalyst such as lithium nitrate, ammonium nitrate or the like. The emulsified reactants are agitated at a predetermined reaction temperature to effect the desired conversion after which the latex is stripped free of unreacted olefinic material and sulfur dioxide together with any volatile impurities. Separation of the resin from the latex is effected by coagulation of the latex with any suitable coagulating agent such as brine, alcohol, brine acid, solutions of electrolytes and the like, followed by water washing, filtration and drying of the product. The resinous material thus obtained is a soft, light, white powder, its solubility in various solvents depending upon the unsaturated reactant material employed, as for example when 1-butene is used, the product is completely soluble in acetone.

Further illustrative of olefinic compounds which may be used in forming the heteropolymers, stabilized in accordance with our invention are 1-butene, 2-butene, propylene, isobutylene, pentenes, hexenes, cyclohexene, styrene, alpha-methylstyrene, 1,3-hexadiene, alpha-chlorostyrene, vinylacetylenes, vinyl chloride, vinyl bromide, chloroprene, 1,3-octadiene, and the like. If desired, a mixture of unsaturate reactant compounds, rather than a single unsaturate, can be utilized, in carrying out the resin-forming reaction with which this invention is concerned.

In carrying out the aqueous emulsion resin-forming reaction described above, it is generally desired to introduce a molar excess of sulfur dioxide into the reaction zone, generally in a mol ratio to the olefinic material of about 2:1 and in some cases as high as up to 5:1 or greater depending upon operating conditions, olefinic material employed, amount of aqueous medium, and the like, although it appears that even in such cases equimolar quantities of sulfur dioxide and the olefinic material enter into reaction.

Emulsifying agents which are applicable in the aqueous emulsion resin-forming reaction are those which are active in an aqueous medium which has a pH below 7, more often within the limits of 0.5 to about 2.0. Effective emulsifying agents include the long chain alkyl sodium sulfates and the branched chain aliphatic or aromatic sodium sulfonates, salts of organic bases, such as amine salts and quaternary ammonium salts. Examples of these materials are diamyl sodium sulfosuccinate, di-secondary butylnaphthalene sodium sulfonate, dodecylamine hydrochloride, dodecylamine sulfate, and the like. The amount of emulsifying agent is that which is necessary to produce a stable emulsion of the ingredients generally from about 1 part to about 10 parts to 100 parts of the total reactants.

Catalysts applicable in the aqueous emulsion resin-forming reaction include such materials as nitrates of the alkali metals and ammonium, nitric acid, potassium persulfate, hydrogen peroxide, organic peroxides such as cumene hydroperoxide, peracetic acid and the like. The amount of catalyst employed in the aqueous emulsion solution will generally be within the limits of from 0.03 to 0.60 part per 100 parts by weight of reactants, more generally from about 0.15 to 0.45 part being generally preferred.

Temperatures for carrying out the aqueous emulsion resin-forming reaction will usually fall within the limits of $-10$ to $60°$ C., more often 10 to $50°$ C. or in some instances below $-10°$ C. Freezing point depressants, for example glycerine, can be utilized in the aqueous emulsion when operating at temperatures below the freezing point of water. The emulsion of the "oil-water" type is generally employed with the ratio of aqueous medium to organic monomeric reactant material being generally between about 1.5:1 and 10:1 in parts by weight. The total pressure on the reactants is preferably at least as great as the total vapor pressure of the mixture so that the initial reactants will be present in liquid phase.

In a preferred embodiment of our invention we admix the tin-containing stabilizer material as a solution or suspension, or in dry form if desired, to a resin-containing latex formed by the reaction of sulfur dioxide with an unsaturated organic material in aqueous emulsion. The latex is then coagulated, and a stabilized dry resin is recovered as the desired product.

The stabilizer material can be added to the resin product after coagulation of the latex prior to washing, i.e., to the filter cake, if desired, or, if desired, after the filter cake is washed and just prior to drying. In any case, it is important that there be thorough mixing of the stabilizer with the resin or resin-containing material.

It is to be understood that although we have set forth various specific means by which the stabilizer materials of our invention can be incorporated with the heteropolymeric resin, our invention is not to be limited thereby. Our invention broadly applies to stabilization of any heteropolymeric resin formed from sulfur dioxide and an unsaturated organic material, by incorporating therewith a tin-containing material of the type described above, in any manner desired.

The advantages of this invention are illustrated in the following examples. The reactants and their proportions and their specific ingredients are presented as being typical and should not be construed to limit the invention unduly.

*Example I*

An olefin-sulfur dioxide resin was prepared by aqueous emulsion polymerization, employing the following recipe:

|  | Parts by weight |
|---|---|
| Olefin blend[1] | 57.7 |
| Sulfur dioxide | 88.3 |
| Water | 180 |
| Ammonium nitrate | 0.5 |
| Maprofix M M[2] | 0.6 |

[1] The olefin blend had the following composition:

|  | Mol per cent |
|---|---|
| n-Butane | 13.4 |
| Iso-butane | 4.6 |
| $C_3$ (propane-propylene) | 1.0 |
| Iso-butylene | 3.6 |
| 1-butene | 63.2 |
| 2-butene-cis | 1.0 |
| 2-butene-trans | 12.5 |
| Butadiene | 0.7 |

[2] Sodium lauryl sulfate dispersing agent (in the form of a paste containing about 60 per cent solids).

The polymerization was conducted for a period of 7 hours and a 95 per cent conversion was obtained, based on the total olefins added.

The reactor was opened and excess sulfur dioxide was vented. The latex formed was found to contain 0.31 gram dry resin per cc. Varying amounts of a 28 per cent aqueous solution-suspension of stannous chloride were added to several 80 cc. portions of the latex. Each latex portion was then coagulated by the addition, with agitation, of 5 cc. of a 40 per cent aqueous solution of magnesium sulfate at $58°$ C. A 100 cc. portion of the latex was coagulated in the same manner in the absence of stannous chloride. Each of the resulting coagula was filtered and washed three times with distilled water and dried for 16 hours at 130 to $150°$ F. The resins were each tested for thermal stability by placing two to three grams of each in a test tube, which was then partially immersed in a constant temperature bath held at $325°\pm2°$ F. for various test periods. The per cent loss in the weight of the resin, providing a measure of the thermal decomposition which took place, was determined at the end of each of the selected test periods. The resin free from stannous chloride served as a control or reference in these tests. Data summarizing the results of the stability tests are tabulated as follows:

|  | Per cent loss in weight at end of test period ($325°\pm2°$ F.) | | |
|---|---|---|---|
| Test period, hours | 0.5 | 1 | 3 |
| Control | 4.0 | 7.2 | 12.2 |
| Per cent stannous chloride added to latex:[1] | | | |
| 1 | .10 | .45 | 1.73 |
| 2 | .04 | .21 | .83 |
| 5 | 0.0 | .03 | .58 |

[1] Based on weight of dry resin in the latex.

*Example II*

An olefin-sulfur dioxide resin containing stannous chloride was prepared in accordance with the procedure of Example I, except that one part of Maprofix M M was employed instead of 0.6 part, and the latex containing stannous chloride was coagulated with methanol at room temperature. A control resin was similarly prepared but in the absence of stannous chloride. Thermal stability tests similar to those of Example I were carried out, and are summarized as follows:

| | Per cent loss in weight at end of test period (325°±2° F.) | | |
|---|---|---|---|
| Test period, hours | 0.5 | 1 | 3 |
| Control resin | 5.8 | 9.8 | 16.9 |
| Resin formed when 0.5 per cent stannous chloride added to the latex [1] | 2.0 | 3.5 | 7.2 |

[1] Basis weight of dry resin in the latex.

*Example III*

A latex was prepared in accordance with the recipe and procedure of Example II. A 100 cc. portion of the latex so-produced was coagulated with 100 cc. of methanol at room temperature, after which the resulting slurry was heated at 55–60° C. to enhance filtration. The slurry was then filtered, washed, and dried. Powdered metallic tin (100–300 mesh), wetted with a few drops of an alkyl sulfate dispersing agent, was added to another 100 cc. portion of the latex which was then coagulated with methanol, filtered, washed, and dried. The resulting dry resins were tested for thermal stability. These tests are summarized in the following tabulation:

| | Per cent loss in weight of resin at the end of the test (325°±2° F.) | | |
|---|---|---|---|
| Duration of test, hours | 0.5 | 1 | 3 |
| Control (resin free from tin) | 4.4 | 7.2 | 13.0 |
| Resin formed by addition of 2 weight per cent tin to the latex [1] | .30 | .66 | 2.20 |

[1] Basis weight of dry resin in the latex.

*Example IV*

Each of several portions of latex of Example III was treated with a different tin compound and then coagulated with methanol, filtered, washed, and dried. Dry resins thus formed were tested together with the control of Example III for thermal stability. These tests are summarized in the tabulation below:

| | Per cent loss in weight of resin at the end of the test (325°±2° F.) | | |
|---|---|---|---|
| Duration of test period | 0.5 | 1 | 3 |
| Control (of Example III) | 4.4 | 7.2 | 13.0 |
| Resin formed by addition to latex of 2 per cent by weight, based on the dry resin therein, of: | | | |
| Stannous Oxide [1] | 0 | 0 | 0.82 |
| Stannous Sulfate [2] | 1.1 | 2.5 | 7.0 |
| Stannous Oxalate [1] | 0.21 | 0.68 | 2.2 |
| Stannic Chloride [3] | 0.17 | 7.2 | 13.0 |

[1] Wetted powder.
[2] Slurry in water.
[3] 10 per cent aqueous solution.

*Example V*

A latex prepared in accordance with the procedure of Example II was divided into three portions. To the first was added 2 weight per cent of stannous tartrate in aqueous solution, based on dry resin in the latex. The latex was then coagulated with methanol, filtered, washed, and dried, and is referred to hereafter as resin #1. The second latex portion was coagulated with methanol, washed, and filtered; aqueous stannous tartrate was added to the washed, wet filter cake, and thoroughly mixed therewith. The filter cake contained 2 per cent by weight of stannous tartrate based on the weight of dry resin therein. Water was evaporated from the filter cake and the resin was then dried at 150° F. for 16 hours. The resulting stabilized dried resin is referred to hereafter as resin #2. These resins, together with the control resin, prepared from the third portion of the latex, by coagulation with methanol, followed by filtering, washing and drying, were tested for thermal stability. Data summarizing these tests are tabulated below:

| | Per cent loss in weight of resin at the end of the test (325°±2° F.) | | |
|---|---|---|---|
| Duration of test, hours | 0.5 | 1.0 | 3.0 |
| Resin #1 | 6.8 | 9.9 | 16.7 |
| Resin #2 | 4.5 | 7.7 | 13.7 |
| Control | 8.1 | 10.8 | 16.6 |

*Example VI*

A relatively large quantity of latex was prepared in accordance with the process of Example II. A portion of this latex was air stripped of sulfur dioxide and then incorporated with 0.5 per cent of stannous chloride in accordance with the procedure of Example II, then coagulated with methanol, filtered, washed, and dried in accordance with Example II. The dried resin was tested for thermal stability. A sample of the same but unstabilized resin was tested for comparison. Data summarizing these tests are tabulated below:

| | Per cent loss in weight of resin at the end of the test (325°±2° F.) | | |
|---|---|---|---|
| Duration of test, hours | 0.5 | 1.0 | 3.0 |
| Control | 4.4 | 7.2 | 13.0 |
| Stabilized resin | 0.44 | 0.90 | 3.5 |

*Example VII*

A further portion of the latex of Example VI prior to incorporation with stannous chloride was air stripped to remove sulfur dioxide and then was adjusted to a pH of 6.0 by adding concentrated ammonium hydroxide. 0.5 per cent[1] by weight of stannous chloride was then added in water to the latex. The resulting latex was then coagulated with methanol, and filtered, and the filter cake was washed, dried, and then tested for thermal stability. A sample of the unstabilized resin was similarly tested for comparison. Data summarizing these tests are tabulated below:

| | Per cent loss in weight of resin at the end of the test (325°±2° F.) | | |
|---|---|---|---|
| Duration of test, hours | 0.5 | 1.0 | 3.0 |
| Control | 4.4 | 7.2 | 13.0 |
| Stabilized resin | 0.34 | 0.87 | 4.0 |

[1] Basis dry resin in latex.

*Example VIII*

A sample of dry powdered olefin-sulfur dioxide resin, prepared in accordance with the procedure of Example I, was thoroughly admixed with 0.5 weight per cent of dry stannous chloride, and then tested for thermal stability. A sample of the same resin containing no additive was similarly tested for comparison. Data summarizing these tests are tabulated below:

|  | Per cent loss in weight of resin at the end of the test (325°±2° F.) | | |
| --- | --- | --- | --- |
| Duration of test, hours | 0.5 | 1.0 | 3.0 |
| Control | 5.8 | 9.7 | 16.9 |
| Stabilized resin | 3.8 | 6.4 | 11.8 |

*Example IX*

The procedure of Example VIII was followed except that the stannous chloride was applied to the dry resin in methanol solution in an amount sufficient to incorporate 0.5 per cent by weight of stannous chloride with the dry powdered olefin-sulfur dioxide resin. The methanol was evaporated and the resulting dry stabilized resin was tested for thermal stability. A sample of the unstabilized resin was similarly tested for comparison. Data summarizing these tests are tabulated as follows:

|  | Per cent loss in weight of resin at the end of the test (325°±2° F.) | | |
| --- | --- | --- | --- |
| Duration of test, hours | 0.5 | 1.0 | 3.0 |
| Control | 5.8 | 9.7 | 16.9 |
| Stabilized resin | 3.3 | 5.9 | 12.1 |

*Example X*

A cyclohexene-sulfur dioxide resin latex was prepared at 50° F., for a 6 hour reaction period, in accordance with the following aqueous emulsion recipe:

| Materials Charged | Parts by Weight |
| --- | --- |
| Cyclohexene | 56.8 |
| Sulfur dioxide | 78.2 |
| Water | 180.0 |
| Maprofix M M | 1.0 |
| Ammonium nitrate | 0.50 |

Cyclohexene conversion was 88.7 per cent. To the resulting latex was added with agitation an aqueous HCl solution of stannous chloride, containing 2 per cent of stannous chloride, based on the weight of dry resin in the latex. The resulting latex admixture was then coagulated by addition thereto of methanol with agitation. The resulting slurry was filtered and the coagulatum was washed, and dried at 130–140° F. for 24 hours. The dried (stabilized) resin was tested for thermal stability in accordance with the procedure of Example I. A sample of the same but unstabilized resin was similarly tested as a control. Data summarizing these tests are as follow:

|  | Per cent loss in weight of resin at the end of the test (325°±2° F.) | |
| --- | --- | --- |
| Duration of test, hours | 0.5 | 1.0 |
| Control | 3.8 | 6.3 |
| Stabilized resin | 2.8 | 5.9 |

*Example XI*

A 1,3-butadiene-sulfur dioxide resin latex was prepared at 86° F. for a reaction period of 4 hours, in accordance with the following aqueous emulsion recipe:

| Materials Charged | Parts by Weight |
| --- | --- |
| 1,3-butadiene | 46.7 |
| Sulfur dioxide | 88.3 |
| Water | 180.0 |
| Maprofix M M | 2.0 |
| Ammonium nitrate | 0.50 |

1,3-butadiene conversion was 100 per cent. The latex was totally coagulated at the end of the reaction period. The slurry was filtered and the coagulum was washed and dried at 130–140° F. for 24 hours. An aqueous solution-suspension formed by mixing stannous chloride with water was added to the dried resin with agitation, the water then removed by vaporization. The resulting stabilized resin contained 2 per cent of its weight of stannous chloride. The stabilized resin was tested for thermal stability in accordance with the procedure of Example I, except that the test was conducted at 467±2° F. The same but unstabilized resin was tested in exactly the same manner as a control. The following data summarize these tests:

|  | Per cent loss in weight of resin at the end of the test period 467±2° (F.) | |
| --- | --- | --- |
| Duration of test, hours | 0.5 | 1.0 |
| Control | 15.2 | 28.2 |
| Stabilized resin | 11.6 | 24.7 |

As will be evident to those skilled in the art, various modifications can be made or followed, in the light of the foregoing disclosure and discussion, without departing from the spirit or scope of the disclosure or from the scope of the claims.

We claim:

1. A method for the preparation of an olefin-sulfur dioxide resin composition, comprising emulsifying a mono-olefinic organic compound in an emulsion of the oil-water type, and in the presence of sulfur dioxide in a mol ratio to said mono-olefinic compound greater than 1:1, effecting interreaction of said sulfur dioxide with said mono-olefinic compound to form a latex, introducing into intimate admixture with said latex a tin material selected from the group consisting of metallic tin, a tin oxide, a tin hydroxide, and a tin salt excepting tin sulfide, and recovering from the resulting latex admixture a sulfur dioxide-olefin resin of improved stability to thermal decomposition as a product of the process.

2. The method of claim 1 wherein the amount of said tin material added to said latex is from 0.1 to 15 per cent by weight, based on the amount of dry olefin-sulfur dioxide resin in said latex.

3. A method for increasing the stability of a heteropolymeric resin to thermal decomposition, formed by the interaction of sulfur dioxide and an unsaturated organic material, in which the unsaturation is between two adjacent carbon atoms and which will polymerize with sulfur dioxide to form said resin, which method comprises incorporating with said heteropolymeric resin a tin material selected from the group consisting of metallic tin, a tin hydroxide, a tin oxide, and a tin salt excepting tin sulfide.

4. A heteropolymeric composition comprising a heteropolymeric resin formed by the interreaction of sulfur dioxide and an unsaturated organic material, in which the unsaturation is between two adjacent carbon atoms and which will polymerize with sulfur dioxide to form said resin, incorporated with a tin material selected from the group consisting of metallic tin, a tin hydroxide, a tin oxide, and a tin salt excepting tin sulfide.

5. A composition of claim 4 wherein said tin material is a salt of an inorganic mineral acid.

6. A composition of claim 4 wherein said tin material is a salt of an organic carboxylic acid containing up to 24 carbon atoms in the molecule.

7. A mono-olefin-sulfur dioxide resin incorporated with from 0.1 to 15 per cent of its weight of stannous chloride.

8. A mono-olefin-sulfur dioxide resin incorporated with from 0.1 to 15 per cent of its weight of stannous oxide.

9. A mono-olefin-sulfur dioxide resin incorporated with from 0.1 to 15 per cent of its weight of metallic tin.

10. A mono-olefin-sulfur dioxide resin incorporated with from 0.1 to 15 per cent of its weight of stannous oxalate.

11. A mono-olefin-sulfur dioxide resin incorporated with from 0.1 to 15 per cent of its weight of stannous tartrate.

12. A latex formed by the interreaction of sulfur dioxide with a mono-olefinic organic compound containing not more than 20 carbon atoms in the molecule, in aqueous emulsion to form an olefin-sulfur dioxide resin, to which has been added from 0.1 to 15 per cent by weight of a tin material selected from the group consisting of metallic tin, a tin hydroxide, a tin oxide, and a tin salt excepting tin sulfide, based on the weight of dry olefin-sulfur dioxide resin present.

13. A composition of matter comprising a product of coagulation of a latex formed by the interreaction of sulfur dioxide with a mono-olefin in aqueous emulsion to form an olefin-sulfur dioxide resin, and to which latex has been added from 0.1 to 15 per cent by weight of a tin material selected from the group consisting of metallic tin, a tin hydroxide, a tin oxide, and a tin salt excepting tin sulfide, based on the weight of dry olefin-sulfur dioxide resin therein.

14. A process for the preparation of an improved olefin-sulfur dioxide resin comprising intermixing an aliphatic olefin mixture comprising butenes, with sulfur dioxide and water in proportions to produce a resulting reaction mixture containing said sulfur dioxide in a mol ratio to total olefin exceeding 1:1, and from 150 to 1000 parts by weight of water per 100 parts of total mono-olefin and sufficient to produce a final latex, including in said admixture an emulsifying agent which is effective in acid medium and a catalyst capable of inducing the reaction of sulfur dioxide with an olefin in the absence of light, maintaining said admixture emulsified at a reaction temperature within the limits of 10 and 140° F. for a time to react at least 50 per cent of said olefinic compound, introducing in a liquid vehicle a tin material selected from the group consisting of metallic tin, a tin hydroxide, a tin oxide, and a tin salt excepting tin sulfide, into intimate admixture with said final latex in an amount of from 0.3 to 8 per cent by weight based on the weight of dry resin therein, adding a coagulating agent to the resulting latex admixture so as to coagulate same, and recovering from a resulting slurry a dry olefin-sulfur dioxide resin composition as a product of the process.

15. The method of claim 1 wherein said tin material is introduced into said latex, in a liquid vehicle.

16. The composition of claim 4 wherein said unsaturated organic material is a cyclomonoolefin.

17. The composition of claim 16 wherein said mono-olefin is cyclohexene.

18. A method for increasing the stability of a heteropolymeric resin formed by the interreaction of sulfur dioxide and an unsaturated hydrocarbon which reacts with sulfur dioxide to form such a resin and which is selected from the group consisting of mono-olefinic hydrocarbons containing not more than 20 carbon atoms per molecule and conjugated di-olefin hydrocarbons containing from 4 to 6 carbon atoms in the molecule, comprising incorporating with such a resin a tin material selected from the group consisting of metallic tin, a tin hydroxide, a tin oxide, and a tin salt excepting tin sulfide.

19. A heteropolymeric composition comprising a heteropolymeric resin formed by the interreaction of sulfur dioxide with an unsaturated hydrocarbon which reacts with sulfur dioxide to form such a resin and which is selected from the group consisting of mono-olefinic hydrocarbons containing not more than 20 carbon atoms per molecule and conjugated di-olefin hydrocarbons containing from 4 to 6 carbon atoms in the molecule, incorporated with a tin material selected from the group consisting of metallic tin, a tin hydroxide, a tin oxide, and a tin salt excepting tin sulfide.

20. A composition of claim 19 wherein said unsaturated organic material is 1,3-butadiene.

21. A method for increasing the stability of a heteropolymeric resin to thermal decomposition, formed by the interreaction of sulfur dioxide and a butene, which method comprises incorporating stannous chloride with the said resin.

22. A heteropolymeric composition comprising a heteropolymeric resin formed by the interreaction of sulfur dioxide with a butene, incorporated with stannous chloride.

WILLIE W. CROUCH.
JOHN F. HOWE.

REFERENCES CITED

The following references are of record in the file of this patent:

UNITED STATES PATENTS

| Number | Name | Date |
|---|---|---|
| 2,113,584 | Fitch et al. | Apr. 12, 1938 |
| 2,476,833 | Albert | July 19, 1949 |